3,687,829
DEIONIZATION OF LIQUID MEDIA
Arnold Factor, Scotia, N.Y., assignor to
General Electric Company
No Drawing. Filed Jan. 11, 1971, Ser. No. 105,643
Int. Cl. B01d; B01k; C02b 1/82
U.S. Cl. 204—149                                             10 Claims

ABSTRACT OF THE DISCLOSURE

Cations and anions are electrochemically removed from aqueous media using a solid anode structure comprising a water-insoluble redox polymer, which, in the oxidized cationic form, has repeating xylylene-bipyridinium units and a solid cathode structure comprising a water-insoluble polyelectrolyte complex of a water-soluble cation exchange resin and a water-soluble redox polymer, which in the oxidized cationic form has repeating xylylene-bipyridinium units. After use, the ion-exchange capacities of the anode and cathode are electrochemically regenerated by reversing their polarity and using an expendable aqueous medium.

---

This invention relates to a process of removing both cations and anions from aqueous media. More specifically this invention relates to an electrochemical process for deionizing aqueous media by use of both an anode and cathode structure incorporating a redox polymer. The anode structure comprises a water-insoluble redox polymer which, in the oxidized cationic form, has repeating xylylene-bipyridinium units and the cathode structure comprises a water-insoluble polyelectrolyte complex of a water-soluble cationic exchange resin and a water-soluble redox polymer, which in the oxidized cationic form has repeating xylylene-bipyridinium units. The anode and cathode structures, after having been used to deionize the aqueous medium, are readily electrochemically regenerated by reversing the polarity and using an expendable aqueous medium.

Ion exchange resins, or in a broader sense, ionic polymers, are a well known general class of polymers which incorporate in the polymer molecule an acidic or basic group in the form of the free acid or base or a salt of such groups. When a solution containing ions, generally an aqueous medium, is brought in contact with these materials, equilibrium is established between the ionic groups of the polymer and the ions in the aqueous media. The extent to which ions are removed from the aqueous medium or exchanged between the polymer and aqueous medium is governed by the well known mass action law. It is obvious that in order to be able to easily separate the polymer from the aqueous medium that the polymer must not be soluble in the aqueous medium. However, there are applications where water-soluble ionic polymers are desired. For a further discussion of such polymers, their chemical composition, their method of making, their uses, their technology, etc., reference is made to the published literature, especially the books on ion exchange resins, for example, "Ion Exchangers in Organic and Biochemistry," edited by Calvin Calmon, and T. R. E. Kressman, Interscience Publishers, Inc., New York, 1957, "Ion Exchange Resins," Robert Kunin and Robert J. Myers, John Wiley and Sons, Inc., New York, 1950, "Ion-Exchange Resins," J. A. Kitchner, Methuen & Co., Ltd., London, 1957, "Ion Exchange Technology," edited by F. C. Nachod and Jack Schubert, Academic Press, Inc., New York, 1956, "Duolite Ion Exchange Manual," Technical Staff of Chemical Process Co., Redwood City, Calif., 1960.

Generally, ion exchange resins specific to either removal of cations or anions are used in removing ions from aqueous media. They are usually cation exchange resins when used for water treating purposes, such as water softening, since it is the cations in the aqueous media which are the ions that it is desired to remove, especially the alkaline earth metal cations which cause hardness in water. When it is desired to remove both cations and anions, for example, to make deionized water, or for desalinization purposes, a mixed bed of a uniform mixture of a cation and an anion exchange is used.

No trouble is experienced in regenerating either a cation or anion exchange resin since regeneration is readily accomplished by flooding the bed with a concentrated solution of the particular ion which is desired to be adsorbed onto the ion exchange resin bed, for example, a saturated solution of sodium chloride can be used to regenerate a cation exchange resin which has removed calcium ion and a concentrated sodium hydroxide solution can be used to regenerate an anion exchange resin which has been used to remove chloride ion. This technique, of course, is not possible when a mixed bed ion exchange resin is used for removal of both cations and anions so the mixed bed is either discarded after use or it is necessary to separate the cation exchange resin from the anion exchange resin and regenerate them separately and then remix. One technique for separation is accomplished by making the two resins of different densities, preferably one which is heavier than water and one which is lighter than water, so that they are readily separated by a flotation technique. This of course requires that during use, means must be used to prevent inadvertent separation.

It would be highly desirable to be able to deionize water by a much simpler process than is now possible by the use of mixed bed, ion exchange resin technology. Furthermore, it would be highly desirable to be able to regenerate these resins without resort to concentrated solutions of the regenerating ions which in themselves cause disposal problems. It would also be highly desirable to have a technique for deionization of water which was easy to implement, simple to operate and could produce deionized water at an economical cost.

In a copending patent application of George E. Heinsohn and myself, Ser. No. 105,642, filed concurrently herewith and assigned to the same assignee as the present invention, redox polymers are disclosed and claimed which have repeating xylylene-bipyridinium units. These redox polymers are prepared by reacting ortho-meta- or para-xylylene dihalides, generally the bromides or chlorides, with 4,4'-bipyridyl. These polymers, as prepared, are water-soluble but can be cross-linked to make them water-insoluble by several techniques.

One technique is to use a benzene having more than two halomethyl groups, for example, a tris(halomethyl) benzene as exemplified by mesityl trihalide, either as a partial or complete replacement for the xylylene dihalide. The other technique is to use an alternate method for preparing the polymer containing the xylylene-bipyridinium units by reacting the xylylene dihalide with 4-cyanopyridine to produce the xylylene bis(4-cyanopyridinium) salt which can be reduced with a reducing agent, for example, sodium dithionite, to produce a polymer having repeating xylylene-bipyridinium units. During the production of the polymer by this method, a side reaction which is as yet unknown, produces cross-linking of the polymer so that the polymer is not water-soluble.

Water insoluble polyelectrolyte complexes are prepared by reacting the water-soluble redox polymer with either a water-soluble or water-insoluble cation exchange resin or the water-insoluble redox polymer with a water-soluble cation exchange resin. The polyelectrolyte complexes retain the redox polymer properties of the redox polymers from which they were prepared, i.e., they have stable oxidized and reduced forms and can be reversibly converted from one to the other. In the reduced form, both the redox polymers and the polyelectrolyte complexes are intensely blue to blue-violet in color so that they are self-indicating as to the oxidation state.

I have now discovered that both cations and anions can be removed from an aqueous medium by applying a direct current electrical potential to an electrode assembly in contact with aqueous media if the electrode assembly has, as its anode, a solid, electrically conductive structure comprising the above described water-insoluble redox polymer and, as its cathode, a solid electrically conductive structure comprising the water-insoluble polyelectrolyte complex described above. While having some electrical conductivity, neither the water-insoluble redox polymer nor the water-insoluble polyelectrolyte complex are sufficiently electrically conductive that, per se, they can be fabricated into an efficient electrode assembly. However, this can be corrected by incorporating conductive fillers which are non-reactive under the electrolytic conditions encountered when the electrode assembly is used, for example, conductive carbon blacks, graphite, noble metals, etc., in either sheet or powdered form in a quantity sufficient to provide the desired electrical conductivity. In order to optimize both the electrical conductivity and the capacity to remove ions from aqueous media, the amount of the conductive filler or adjuvant should be limited to the minimum amount necessary to give the desired degree of electrical conductivity.

When the conductive adjuvant is not a sheet, foil, plaque, etc., which, per se, provides the required solid structure, a binder which is inert to the aqueous medium under the electrolytic conditions used is required to bind the mixture of the conductive adjuvant and the redox polymer or the polyelectrolyte complex into a solid, unitary mass. Again, to optimize electrical conductivity and the capacity to remove ions from aqueous media as well as to permit the solid structure to be porous so that the inner portions of the anode and cathode can be contacted by the aqueous media, only the minimum amount of binder required to provide an integral structure which is strong enough to withstand the conditions encountered during use, should be used. Since graphite is readily available as a powder and in various fabricated shapes, for example, as fiber which has been woven into cloth, films, etc., and has adequate electrical conductivity I prefer to use graphite as the conductive adjuvant. The optimum concentration of graphite is in the order of 40 to 60% by weight, generally about 50%. When metal powders are used, correction should be made for the difference in density since one of the factors governing the conductivity of the mixture is the volume relationship of the ingredients. Although the redox polymer and the polyelectrolyte complexes are usable at elevated temperatures in an inert atmosphere, and, therefore, plastic molding techniques could be used to mold the electrodes, it is generally more convenient to use a solution of the binder, which conveniently is a fluorohydrocarbon polymer which is soluble in a solvent, in an amount of from 3 to 10%, generally about 5% weight of the solids. So that the mixture of the conductive adjuvant and the redox polymer or the polyelectrolyte complex is thoroughly wet and the binder uniformly dispersed throughout the mixture, generally sufficient solvent is used to provide a paste which is conveniently spread onto a conductive support, for example, a screen, cloth, solid, or perforated film, etc., of inert metal or conductive graphite or carbon and the solvent removed either by evaporation or extraction of the solvent with water to produce the solid anode or cathode structure. When so constructed the anode and cathode structures are sufficiently porous or at least permeable to the aqueous medium that no precautions need to be taken to insure adequate contact of the inner surfaces of the electrodes by the aqueous media. Other techniques for fabricating electrodes will be readily apparent to those skilled in the art based on the techniques used in the battery and fuel cell art for the construction of electrodes. The actual techniques used in fabricating the electrodes forms no part of this invention. As is illustrated in the examples, it is preferable to have a majority of the conductive adjuvant present during the time when the water-insoluble redox polymer or polyelectrolyte complex is being formed so that the polymer or complex forms a coating on the conductive powder or on the conductive sheet, film, etc. The presently preferred method of fabricating the anode and cathodes are illustrated in the examples to follow.

The redox polymer in the anode structure, in its oxidized cationic form has repeating units of the formula:

I 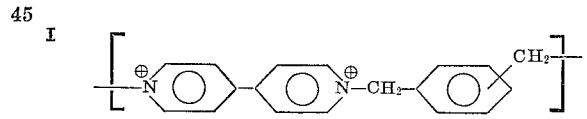

It is to be recognized that when the polymer is rendered insoluble and cross-linked by using a benzene compound containing more than two halomethyl groups that there will be the corresponding number of methylene groups on the benzene ring on the right hand side of the repeating unit which are made from such halomethyl benzenes, i.e., the above formula of the repeating units does not contain those units which are the units responsible for the cross-linking, but this will be readily understood by those skilled in the art from the above teachings.

These redox polymers, in the reduced form, are extremely reactive with oxygen in either gaseous or dissolved form. Therefore, the redox polymers, as prepared, are always in the oxidized form having repeating units of the above formula. Therefore, prior to using the anode structure, it is necessary to prereduce it either by chemical or electrochemical means. A convenient way is to make it the cathode using a silver anode while immersed in expendable aqueous media preferably containing the same anion that is associated with the polycation of the redox polymer. By following this electrolysis potentiometrically it is possible to determine when the redox polymer in the structure is completely reduced. In the reduced form the polymer has repeating units having the formula:

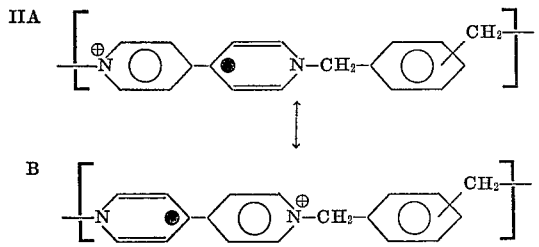

It is obvious from Formula II–A and B that the reduced form is a resonating free radical form having an extra electron whose exact situs in the ring is variable but for convenience sake is shown in two of the variable positions. This electron is readily given up on being oxidized to the structure illustrated by Formula I. In going from the reduced form to the oxidized form, the repeating unit gains a positive charge which will remove and become associated with an anion present in the aqueous medium and functions as an anion exchange resin. This is the anode reaction which occurs in my process since at the anode the reduced form gives up an electron and becomes oxidized simultaneously removing one anion from solution for each repeating unit so oxidized.

The particular anion associated with the redox polymers is dependent upon the past history. As made from a xylyene halide, the anion will be the halide of the particular xylyene halide used. However, after being made, this redox polymer functions as an anion exchange resin in an aqueous media containing other anions than the particular anion associated with the redox polymer and establishes an equilibrium between the anions in solution and the anions associated with the redox polymer according to the mass action law. This is the same effect noted with any anion exchange resin with the particular anion associated with the resin being determined by the affinity of the polymer for the particular anions and the concentration of the various anions in solution. This is a well known principle and is discussed in detail, for example in the above referenced books.

It is obvious from the above that the particular anion associated with the redox polymer is not critical and can be any of the various anions which are not attached to or form part of a polymer molecule, for example, the polyanion of the cation exchange resin discussed. The non-polymeric anions can be, for example, halides, nitrate, sulfate, phosphate, carbonate, bicarbonate, etc. It is also obvious that after these resins have been used to remove anions from solution, especially after repeated cycles, that the anions associated with the resins will be those anions found in the aqueous medium so treated.

The requirement that the anion be non-polymeric is based on the fact that polymeric anions are the anions of the cation exchange resins which form the polyelectrolyte complexes required for the cathode structure. These polymeric anions even though insoluble in water or any other solvent will react with the water-soluble polycations of the redox polymer to form the polyelectrolyte complex which in fact is a polymeric salt, or polysalt. Since all cation exchange resins are polyanions of an acid in the hydrogen form, or polyanions of a salt when in the salt form, they all are capable of forming polyelectrolyte complexes with the above redox polymers. They all contain some acidic group, for example, carboxylic, sulfonic, phosphonic, phosphorous or phosphoric, etc., acid groups, which is responsible for the cation exchange properties. Since the balance of the polymer molecule does not contribute anything to the ion exchange capacity of the resin, the molecular weight of the balance of the molecule is preferably as low as possible in order to have the highest capacity for exchanging ions per unit weight of polymer. For these reasons, polymers of the simple, low molecular weight monomers are preferred, for example, of styrene sulfonic acid, styrene phosphonic acid, styrene phosphorous acids, ethylene sulfonic acid, acrylic acid, etc., either as homopolymers or copolymers. It is to be understood that these polymers are usually prepared by indirect methods, i.e., sulfonation of polymers of styrene, etc.

The cathode needs to be formed from a water-soluble redox polymer and a water-soluble cation exchange resin. The water-solubility of cation exchange resins arises because they contain a sufficient number of acidic groups per polymer molecule to render them water-soluble. They also have not been cross-linked which would render them insoluble in any solvent. The water-solubility of the redox polymer and the cation exchange resin renders the making of the cathode structure simple since the conductive adjuvant can be present in either of the two aqueous solutions prior to mixing which causes the polyelectrolyte complex to precipitate on the surface of the conductive adjuvant. Alternatively, solvent systems can be devised to dissolve the polyelectrolyte complexes so that their solution can be used to impregnate or coat the electrically conductive adjuvant. A particularly useful solvent system is given in the examples. Precipitation or coating of the polyelectrolyte complex onto the conductive adjuvant gives a more conductive composition than when the adjuvant is mixed with the solid polyelectrolyte complex.

The ability of the polyelectrolyte complexes to absorb cations from solution is due to the fact that the bipyridinium group in the repeating unit has two positive charges associated with it in the oxidized form and only one charge associated with it in the reduced form. In forming the polyelectrolyte complex the two charges of the oxidized form of the polymer are associated with two negative charges of the anionic groups of the cation exchange resin, forming a polysalt. When this complex is reduced, as it is at the cathode during my process, the repeating unit has the form as shown by Formula II which has only one positive charge, the one anion of the cation exchange resin previously associated with the positive charge which disappears on reduction, is freed in its hydrogen form making it available for adsorbing a cation from solution. This is illustrated in the following equation. For illustrative purposes only, p-xylylene-4,4'-bipyridinium dibromide is used as illustrative of my redox polymer and the sodium salt of polystyrene sulphonic acid is used as illustrative of the salt of a cation exchange resin:

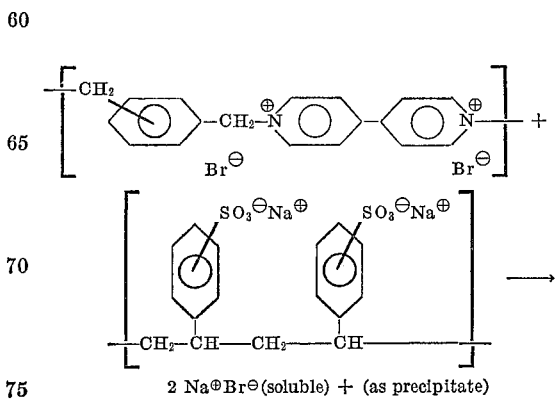

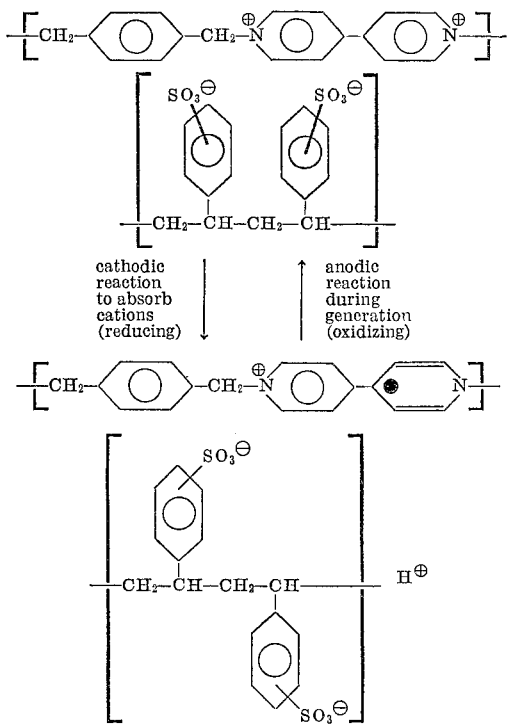

From the above description, when the anode and cathode are made into electrode structures and electrical potential applied thereto while in contact with aqueous medium, the anode will adsorb anions and the cathode will absorb cations thereby effectively deionizing the aqueous media. Polyvalent cations will be preferentially adsorbed over monovalent cations to such a high degree that the monovalent cation can be present in a considerably greater concentration than the polyvalent cations and yet the polyvalent cations will still be preferentially adsorbed. Complete deionization including both polyvalent cations and monovalent cations can be effected by having sufficient exchange capacity present in the anode and cathode structures.

Regeneration of the anode after it has adsorbed anions and the cathode after it has adsorbed cations can be readily effected by reversing the polarity of the electrode structure while contacting a waste or expendable aqueous medium thereby reversing the above described anode and cathode processes and discharging the adsorbed anions and cations to the expendable aqueous medium.

When desired, the functioning of this electrolytic process both in the deionizing and regeneration cycles can be monitored by including a reference electrode as a third electrode which can be used to potentiometrically monitor the process by techniques well known in electrochemical art.

In order that those skilled in the art may readily understand my invention, the following examples are given by way of illustration and not by way of limitation. In all of the examples parts are by weight and temperatures are in degrees centigrade unless otherwise stated.

EXAMPLE 1

This example illustrates the preparation of the electroactive materials used in this invention. Cation adsorbing materials used were polyelectrolyte complexes of polyxylene-bipyridinium bromides, either the para, meta or ortho isomers, and the sodium salts of the cation exchange resins, poly(styrenesulfonate), poly(ethylenesulfonate) and polyacrylate; hereinafter for the sake of brevity, these compounds are designated as $PXB-Br_2$, $PXB(PSS)_2$, $PXB(PES)_2$, and $PXB(PA)_2$, respectively. Pure samples of polyelectrolytes complexes were prepared by mixing an aqueous solution containing one equivalent of $PXB-Br_2$ with an aqueous solution containing one equivalent of the salt of the cation exchange resin. Elemental analysis confirmed that expected reaction occurs in each case to give material with the proper stoichiometry.

Generally, it was found that optimum electrolytic activity of these polyelectrolyte complexes was realized when they were prepared in the presence of graphite powder so that the electroactive material was in intimate contact with the electrode material. This could be accomplished either by carrying out the original synthesis of these polyelectrolyte complexes in the presence of conductive graphite powder, the coprecipitation method, or by dissolving the complexes in a solvent and mixing the solution with graphite powder followed by removal of all or part of the solvent to cause the complex to precipitate. Two variations of the coprecipitation method were used.

The first variation hereinafter referenced as procedure A, demonstrates the formation of $PXB(PSS)_2$ in situ in the electrode structure. A chemical equivalent mixture of $PXB-Br_2$ and sodium poly(styrenesulfonate) were ground with sufficient graphite powder to give a polyelectrolyte complex containing 50% graphite. This mixture was used to prepare electrodes as described in Example 2. The actual formation of the polyelectrolyte complex is delayed until the leaching step with water described in Example 2.

In the second variation hereinafter referenced as procedure B, an aqueous solution of $PXB-Br_2$ containing graphite powder was rapidly mixed with an aqueous solution containing sodium poly(styrenesulfonate) in amounts equivalent to the $PXB-Br_2$ causing the polyelectrolyte to precipitate on the graphite, the latter being 50% by weight of the combined weight of the complex and graphite.

Illustrative of the second method, hereinafter referenced as procedure C, is the use of a ternary solvent system to prepare electrode material. Polyelectrolyte complexes of water soluble polycations and polyanions although not soluble in common solvents are soluble in mixed solvents containing high salt concentrations. Para-$PXB(PSS)_2$ was found soluble in a ternary solvent of 110 ml. water, 38 ml. acetone and 60 g. sodium bromide. It was found that solutions of $PXB(PSS)_2$ could be made to precipitate in the presence of graphite by flash vacuum evaporation of the acetone from the hot ternary mixture. Material prepared this way showed the highest coulombic capacities and gave the most reproducible results as compared to other precipitation methods.

In a typical experiment 1.75 g. of $PXB(PSS)_2$ dissolved in 110 ml. of the above ternary solvent containing 1.75 g. of graphite was heated to reflux and caused to precipitate by removing acetone with a roto-vac apparatus. The rubbery precipitate was washed with water and vacuum dried. Electrodes prepared from this material showed electrolytic capacities, (% C.) of 70–80% for up to 200 cycles.

As previously mentioned, anion absorbing materials utilize the water insoluble forms of polybipyridinium salts which can be made by several means. In this example polymesitylylene-bipyridinium dibromide, hereinafter, for the sake of brevity designated as $PMB-Br_2$, was made by reacting a molar equivalent of $\alpha,\alpha',\alpha''$-tribromomesitylene with a molar equivalent of 4,4'-bipyridyl in acetonitrile. For maximum electrolytic activity material was best prepared in the presence of an equal weight of graphite.

EXAMPLE 2

This example illustrates the general procedure for the preparation and testing of my electrodes. The materials prepared as in Example 1, were ground, weighed and mixed thoroughly with a sufficient amount of a 3% solution of polyvinylidene fluoride in dimethylacetamide to provide 5% binder based on the total weight of solids. In some examples additional graphite was added by grinding with the material prior to adding the solution of the binder. The resulting paste was painted on one side of 10-mil graphite tape serving as the current collector or distributor. The dimethylacetamide was removed by soaking the electrode structure for at least 12 hours in distilled water. This is the leaching step which causes the in situ formation of the polyelectrolyte complex mentioned in Example 1. The projected areas of the electrodes were 7.25 cm.$^2$.

The electrochemical cells used in this study consisted of two compartments separated by a medium fritted glass disc and an agar-KCl plug. Generally, the electrolyte in the test electrode compartment was 0.5 M NaCl. The reference electrode dipped into this same compartment. No evidence of silver migration into the test compartment was observed on prolonged cycling. The electrolyte solutions were deaerated with nitrogen and covered with flowing nitrogen during electrolysis. The solutions were not stirred.

Electrochemical results were obtained using constant current cyclic electrolysis equipment. Electrodes were cycled between −0.65 and +0.2 volt versus an Ag-AgCl reference electrode. In reporting this data the following abbreviations are used:

(1) $i$=current.
(2) $t_1$=time to reduce electrode, $t_2$=time to oxidize electrode.
(3) $it$=time×current=coulombs passed.
(4) E=voltage at center of current-voltage curve.
(5) %C=percent of theoretical coulombic capacity.
(6) $C_{c,a}$=capacity in milliequivalents calculated from the coulombs passed during the cathodic, $c$, or anodic, $a$, half cyclic.
(7) $C_{c,a}{}^A$=capacity in milliequivalents calculated for A from the change in solution concentration.

EXAMPLE 3

This example illustrates the electroactivity of electrodes fabricated from PXB(PSS)$_2$ by the procedures discussed in Examples 1 and 2. The results obtained for an electrode prepared by procedure A are shown in Table I for both sodium chloride and calcium chloride electrolytes. The results obtained with electrodes having different amounts of graphite (C), polyvinylidene fluoride (PVF) and PXB(PSS)$_2$ (PEC) and made by procedure B are shown in Table II.

TABLE I.—POTENTIAL-TIME DATA FOR PXB(PSS)$_2$ FORMED IN SITU

| Composition | Cycle | $i$, ma. | $it_1$, ma. min. | −E$_1$, volts | Percent C$_1$ | $it_2$, ma. min. | −E$_2$, volts | Percent C$_2$ |
|---|---|---|---|---|---|---|---|---|
| 0.5 M NaCl | 1 | 2 | [1] 54 22 | 0.48 | 41 | 11 | 0.38 | 20 |
|  | 2 | 2 | 14 | 0.49 | 26 | 11.5 | 0.39 | 21 |
|  | 182 | 2 | 12.5 | 0.48 | 23 | 10 | 0.38 | 18.5 |
| 0.5 M NaCl | 187 | 0.9 | 14.7 | 0.47 | 27 | 10.0 | 0.39 | 18.5 |
|  | 189 | 0.5 | 24.4 | 0.46 | 45 | 10.6 | 0.39 | 19.5 |
|  | 191 | 5 | 7.5 | 0.46 | 14 | 5.7 | 0.39 | 10.5 |
|  | 201 | 2 | 10.5 | 0.48 | 19.5 | 9.0 | 0.39 | 16.5 |
|  | 301 | 2 | 12.0 | 0.49 | 22 | 8.0 | 0.39 | 15.0 |
|  | 1 | 2 | [1] 100 30.5 | 0.47 | 30.5 | 25.5 | 0.36 | 25.5 |
|  | 2 | 2 | 29 | 0.47 | 29 | 24.2 | 0.36 | 24.2 |
| 0.5 M CaCl$_2$ | 95 | 2 | 26.5 | 0.46 | 26.5 | 22.5 | 0.38 | 22.5 |

[1] Theoretical capacity.

TABLE II.—POTENTIAL-TIME DATA FOR PXB(PSS)$_2$ FORMED IN PRESENCE OF GRAPHITE

| Composition | Cycle | $i$, ma. | $it_1$, ma. min. | −E$_1$, volts | Percent C$_1$ | $it_2$, ma. min. | −E$_2$, volts | Percent C$_{22}$ |
|---|---|---|---|---|---|---|---|---|
| 10.3 mg. PEC | 1 | 2 | [1] 28 11 | 0.54 | 39 | 3.7 | 0.42 | 13 |
|  | 2 | 2 | 9 | 0.54 | 32 | 4.0 | 0.42 | 14 |
| 137 mg. C | 5 | 2 | 7 | 0.54 | 25 | 4.5 | 0.41 | 16 |
| 80 mg. PVF | 10 | 2 | 7 | 0.54 | 25 | 5.0 | 0.40 | 18 |
|  | 14 | 1 | 8.5 | 0.53 | 30 | 5.3 | 0.42 | 19 |
|  | 18 | 0.5 | 11 | 0.52 | 39 | 5.7 | 0.44 | 20 |
|  | 145 | 2 | 7 | 0.52 | 25 | 4.5 | 0.41 | 16 |
| 3.8 mg. PEC | 1 | 2 | 10.3(1) 14.6 | 0.51 | 140 | 5.5 | 0.43 | 53 |
|  | 2 | 2 | 8.8 | 0.50 | 85 | 5.0 | 0.41 | 48 |
| 114 mg. C | 5 | 2 | 7.8 | 0.51 | 76 | 6.0 | 0.41 | 58 |
| 20 mg. PVF | 10 | 2 | 7.5 | 0.51 | 73 | 5.0 | 0.41 | 48 |
|  | 21 | 0.5 | 9.0 | 0.49 | 87 | 4.0 | 0.44 | 39 |
|  | 23 | 1 | 7.5 | 0.50 | 73 | 4.8 | 0.44 | 46 |
|  | 26 | 2 | 5.5 | 0.51 | 53 | 4.5 | 0.43 | 44 |
|  | 29 | 0.25 | 9.3 | 0.48 | 90 | 4.3 | 0.44 | 42 |
| 27.2 mg. PEC | 1 | 2 | 72(1) 62 | 0.52 | 86 | 35 | 0.40 | 49 |
| 98.7 mg. C | 2 | 2 | 45 | 0.54 | 62 | 36 | 0.39 | 50 |
| 20 mg. PVF | 7 | 2 | 41 | 0.54 | 57 | 35 | 0.42 | 49 |
|  | 9 | 1 | 46.5 | 0.53 | 65 | 41.5 | 0.42 | 58 |
|  | 10 | 4 | 36 | 0.55 | 50 | 34 | 0.39 | 47 |
|  | 20 | 4 | 36 | 0.56 | 50 | 34 | 0.40 | 47 |
| 8.31 mg. PEC | 1 | 2 | 2.2(1) 24 | 0.50 | 108 | 12 | 0.41 | 54 |
| 116 mg. C | 2 | 2 | 19 | 0.50 | 85 | 12 | 0.42 | 54 |
| 20 mg. PVF | 43 | 2 | 17 | 0.50 | 77 | 13 | 0.43 | 54 |

[1] Theoretical capacity.

The data indicates that electrodes containing PXB (PSS)$_2$ showed considerable electroactivity after repeated cycling.

EXAMPLE 4

This example illustrates the preparation and testing of PXB(PA)$_2$. The sodium polyacrylate was prepared by carefully adding 10 grams, 0.145 millimole, of polyacrylic acid to 32 ml. of methanol containing 5.82 g. of sodium hydroxide. The resulting slurry was stirred for 24 hours, filtered under nitrogen, and dried at 50°/20 mm. to yield 13.0 grams of white powder. Sodium analysis indicates an equivalent weight of 97 grams per mole, i.e. 23.61% Na.

A 0.210-gram portion, 0.5 millimole, of PXB-Br$_2$ in 0.1 M NaCl, the current was 2 ma./in.$^2$ and 150 mg. of total electrode powder was used per square inch of electrode surface. The results are given in Table III.

Precipitation of the PXB(PA)$_2$ complex on graphite is not essential in developing reactivity. However, it is essential in obtaining higher values of percent C. Ratios of complex to total graphite that are larger than approximately one do not increase the percent utilized above 60% and serve only to decrease the actual capacity. The highest capacity and utilization have been obtained on an electrode with a composition of six parts PXB(PA)$_2$, two parts graphite in precipitate, and three parts added graphite. Some increase in capacity might be found by lowering the graphite content, but the utilization is likely to decrease.

TABLE III.—CAPACITY OF PXB(PA)$_2$ ELECTRODES

| M | N=0 mg. | | | | N=50 mg. | | | | N=100 mg. | | | | N=150 mg. | | | | N=200 mg. | | | |
|---|---|---|---|---|---|---|---|---|---|---|---|---|---|---|---|---|---|---|---|---|
| | C° | n | C | Percent C | C° | n | C | Percent C | C° | n | C | Percent C | C° | n | C | Percent C | C° | n | C | Percent C |
| 0 mg | | | | | | | | | | | | | | | | | 0.68 | 1 | 0.18 | 26 |
| | | | | | | | | | | | | | | | | | | 191 | 0.04 | 5 |
| 33 mg | | | | | 1.04 | 1 | 0.62 | 61 | 0.77 | 1 | 0.44 | 57 | | | | | | | | |
| | | | | | | 15 | 0.52 | 52 | | 14 | 0.42 | 54 | | | | | | | | |
| | | | | | | ¹16 | 0.42 | 40 | | ²15 | 0.34 | 44 | | | | | | | | |
| | | | | | | 53 | 0.21 | 20 | | 47 | 0.20 | 26 | | | | | | | | |
| 122 mg | 1.04 | 1 | 0.42 | 41 | | | | | 0.52 | 1 | 0.24 | 46 | 0.42 | 1 | 0.16 | 38 | | | | |
| | | 10 | 0.26 | 26 | | | | | | 10 | 0.21 | 40 | | 23 | 0.13 | 31 | | | | |
| 300 mg | 0.52 | 1 | 0.28 | 54 | | | | | | | | | | | | | | | | |
| | | 14 | 0.27 | 51 | | | | | | | | | | | | | | | | |
| | | 75 | 0.20 | 38 | | | | | | | | | | | | | | | | |
| | | 300 | 0.12 | 23 | | | | | | | | | | | | | | | | |

¹ Electrolyte was changed to 0.1 M CaCl$_2$ at cycle 16.
² Electrolyte was changed to 0.0125 M NaCl + 0.0125 M NaCl at cycle 15.

NOTE.—M=Mg. of graphite in precipitate per 100 mg. of PXB(PA)$_2$; N=Mg. graphite added during electrode fabrication per 100 mg. of precipitate; C°=Calculated capacity, meq. per gram or electrode; n=Cycle number.

100 milliliters of water was added to a rapidly stirred mixture containing a 0.1 gram, 1.0 millimole, of this sodium polyacrylate mixed with a 0.20 gram of graphite in 100 ml. of water. The resulting precipitate was isolated by filtration, washed exhaustively with water, and dried for 24 hours at 25°/20 mm. to yield 0.3670 gram (82% of theoretical) dark material, 45.5 percent active material and 55.5 percent graphite.

Several electrodes were fabricated by the procedure of Example 2 from the PXB(PA)$_2$. The complex was precipitatd on graphite by mixing solutions containing stochiometric amounts of PXB-Br$_2$ and the above neutralized polacrylic acid. The amount of graphite in the precipitated phase was varied, as was the amount of graphite powder added during electrode fabrication. The electrolyte was

EXAMPLE 5

This example demonstrates the actual adsorption and deadsorption of Na$^+$ ions, of Ca$^+$ ions, and the high specificity for Ca$^{++}$ ion adsorption in the presence of Na$^+$ ions. These adsorption tests were performed using 0.025 M NaCl and in 0.0125 M CaCl$_2$. In both cases electrodes made from 1.32 gm. of para-PXB(PSS)$_2$ prepared by procedure C, were electrolyzed at 12.9 millamperes. As usual, after fabrication, the electrodes were allowed to stand in distilled water. This stand water was changed until bromide was no longer present in solution. The adsorption test results are summarized in Table IV. These results indicate that both Na$^+$, and Ca$^{++}$ are cyclically adsorbed with 85–90% coulombic efficiency.

TABLE IV.—ADSORPTION RESULTS PARA-PXB(PSS)$_2$

| Cycle | Cathodic half-cycle | | | | | Anodic half-cycle | | | | |
|---|---|---|---|---|---|---|---|---|---|---|
| | Percent C$_1$ | −E$_1$ (volts) | C meq. | C$^A$ meq. | C$^A$/C | Percent C$_2$ | −E$_2$ (volts) | C meq. | C$^A$ meq. | C$^A$/C |
| | 0.025 molar NaCl | | | | | | | | | |
| 1 | 46 | 0.62 | 0.32 | 0.27 | 0.84 | 37 | 0.22 | 0.26 | 0.22 | 0.89 |
| 2 | 37 | 0.62 | 0.25 | 0.20 | 0.80 | 30 | 0.22 | 0.20 | 0.20 | 1.00 |
| 3 | 35 | 0.60 | 0.24 | 0.21 | 0.87 | 30 | 0.24 | 0.20 | 0.20 | 1.00 |
| 30 | 19 | 0.65 | 0.13 | 0.10 | 0.77 | 16 | 0.18 | 0.11 | 0.10 | 0.91 |
| 31 | 19 | 0.63 | 0.13 | 0.10 | 0.77 | 16 | 0.15 | 0.11 | 0.10 | 0.91 |
| | 0.0125 molar CaCl$_2$ | | | | | | | | | |
| 1 | 34 | 0.63 | 0.33 | 0.28 | 0.85 | 25 | 0.25 | 0.25 | 0.20 | 0.80 |
| 2 | 27 | 0.62 | 0.27 | 0.22 | 0.81 | 23 | 0.23 | 0.23 | 0.20 | 0.87 |
| 3 | 26 | 0.62 | 0.26 | 0.20 | 0.77 | 21 | 0.24 | 0.21 | 0.19 | 0.90 |

An electrode containing 50 mg. of Para-PXB(PSS)$_2$ was cycled at 0.445 ma. (1 ma./in.$^2$) in an electrolyte 0.0125 M in NaCl and 0.0125 M in CaCl$_2$. The capacity on the first cycle was found to be 0.39 meg./g. (%C=54) of graphite plus polymer. By the fifth cycle, the value had declined to 0.33 meg./g. where it remained through cycle 160. The electrolysis was stopped at this point.

An adsorption test was performed in 0.0125 M in both NaCl and CaCl$_2$, with 0.7904 g. of para-PXB(PSS)$_2$ at 7.5 ma. (1.0 ma./in.$^2$). The results are given in Table V.

TABLE V.—RESULTS OF PXVPSS ADSORPTION EXPERIMENT

| Cycle | Percent $C_c$ | $C_o$ | Na $C_c/C$ | Ca $C_c/C$ | $C_a$ | Na $C_a/C$ | Ca $C_a/C$ |
|---|---|---|---|---|---|---|---|
| 1 | 24 | 0.21 | 0.05 | 0.90 | 0.15 | 0.06 | 0.87 |
| 2 | 18 | 0.17 | 0.00 | 0.82 | 0.14 | 0.00 | 0.93 |
| 3 | 18 | 0.17 | 0.06 | 0.82 | 0.14 | 0.00 | 0.93 |
| 41 | 11 | 0.12 | 0.00 | 0.92 | 0.10 | 0.06 | 1.10 |

Note.—Average CS$\phi$/C~0.03; Average CS″/C~0.9.

The calcium ion is removed and replaced in solution with 90% coulombic efficiency, while the sodium ion is little effected, even at molar ratios of four sodium to calcium. At the end of the reduction on cycle 51, the solution contained 0.6 mmole Na$^+$ and 0.15 mmole Ca$^{++}$; the current efficiency for calcium adsorption apparently remained high in reaching these concentration levels.

There are additional chemical effects apparent. During equilibration of the electrode in the mixed electrolyte prior to the start of electrolysis, the sodium ion in solution increased by 0.14 meq. while the calcium ion decreased by a like amount. During the fifty cycles, the calcium ion in solution had decreased by an additional 0.27 meq. The electrode was calculated to contain 0.86 meq. of PXB(PSS)$_2$.

In conclusion, Ca$^{++}$ ion is found to be selectively removed with 90% coulombic efficiency in the presence of a four-fold excess of Na$^+$.

EXAMPLE 6

This example demonstrates the reversible absorption of anions by a PMB-Br$_2$ electrode and reversible demineralization by a cell comprising a PMB-Br$_2$ anode and PXB(PSS)$_2$ cathode.

In these tests, ion adsorption electrodes were prepared by precipitating the appropriate polymer species on graphite as described is Example 1 and grinding the resulting product to pass 400 mesh. A weighed amount of this powder was mixed with an additional weighed amount of graphite powder for forty-eight hours and the mixture then ground together for one-half hour. A slurry of this mixed powder was prepared by adding a five percent solution of polyvinylidene fluoride (PVF) in dimethylacetamide (DMA) and additional DMA. The slurry was uniformly painted on a predetermined area of a sheet of graphite foil. The finished electrode was dried at room temperature in vacuum for forty-eight hours to remove the DMA. After the DMA was removed, the electrodes were equilibrated in 0.0125 M NaBr for twelve hours. The electrode characteristics are given in Table VI.

TABLE VI.—ELECTRODE CHARACTERISTICS

| Electrode | Material | $w_a$ | $w_b$ | $w_c$ | $w_d$ | DMA, ml. | $A_{cm^2}$ | $C_0$, meq. | Percent $C_1$ | Percent $C_2$ |
|---|---|---|---|---|---|---|---|---|---|---|
| Cation adsorbing | Meta-PCB(PSS)$_2$ | 0.488 | 0.488 | 0.588 | 0.078 | 1.75 | 55 | 0.68 | 26 | 21 |
| Anion adsorbing | PMB-Br$_2$ | 0.129 | 0.101 | 0.125 | 0.018 | 0.41 | 18 | 0.307 | 70 | 72 |

Note.—$w_a$=Weight of polymer in grams; $w_b$=Weight of graphite powder in precipitated sample; $w_c$=Weight of graphite powder added during fabrication; $w_d$=Weight of polyvinyldine fluoride; DMA=Total volume dimethylacetamide; $C_0$=Calculated electrode capacity, meq.; Percent $C_1$=Percent actually available capacity found for similar small test electrodes, Percent $C_2$=Percent actually available capacity found for this experiment.

In the first part of this test anion adsorption by a PMB-Br$_2$ electrode was demonstrated by a cell where a silver screen was used as the counter electrode, steps 2 through 4 in Table VII. Theoretically the cell reaction is $$(PMB^{++})(Br^-)_2 + Ag \rightleftharpoons (PMB^+)Br^- + AgBr$$

where the occurrence of other reactions of the anion absorbing material would cause changes in bromide ion concentration. For example, when the silver electrode is made anodic, bromide ion is removed from solution. If reduction of PMB-Br$_2$ does not result in ejection of bromide ion from polymer phase into solution, the bromide content in the solution should have decreased. The actual change in bromide content divided by the predicted change if the polymer electrode reaction failed totally is a measure of the current *inefficiency*. The analytical results for bromide ions show that the postulated reaction did take place and bromide ions were removed from and returned to the solution nearly quantitatively.

Demineralization was demonstrated in the second segment of the experiment consisting of electrolysis of the anion adsorbing electrode against the cation adsorbing electrode, steps 6 and 7 in Table VII.

$$(PMB^+)(Br^-) + (PXB^{++})(PSS^-)_2 + Na^+ + Br^- \rightleftharpoons (PMB^{++})(Br^-)_2 + (Na^+)(PXB^+)(PSS^-)_2$$

In step 6, the reaction proceeded as written, both sodium and bromide ions were removed, and demineralization was demonstrated. In step 7, the reaction was reversed and both cations and anions were returned to the electrolyte. The results for step 6 reinforce the earlier conclusion that the reaction of the anion adsorbing material proceeded as anticipated. First, adsorption of anions could occur in step 6 only if desorption had occurred in step 4. Secondly, the results demonstrate that changes in bromide content would have been observed had they occurred.

The silver electrode was fine screen, heat sealed into a double wrap of nylon screen. The electrode was cleaned by washing in concentrated hydrochloric acid, ammonium hydroxide and several portions of distilled water.

The cell was assembled with the silver electrode between the cation and anion electrodes. Twenty-five ml. of 0.0125 M NaBr electrolyte was introduced into the cell and the solution was deaerated by bubbling with nitrogen gas presaturated with water.

The electrolysis current was constant at ±5.56 ma. The potential-time curves for the electrode of interest were recorded against a silver-silver chloride reference electrode. In addition, the cell potential was recorded when the ion adsorption electrodes were electrolyzed against each other.

Duplicate samples of electrolyte were removed at each step of the electrolysis and stored in polyethylene bottles. For bromide analysis, the samples were 0.50 ml. and for sodium analysis, 0.10 ml. Bromide analysis was by titration with silver ion, sodium analysis was by atomic absorption.

While the above description and examples have illustrated the preferred embodiments and variations of my invention, other useful variations and permeations will be readily apparent to those skilled in the art in light of the above teachings. It is therefore to be understood that changes can be made in the particular embodiment of the invention described which are within the full intended scope of the invention as defined by the appended claims.

What I claim as new and desire to secure by Letters Patent of the United States is:

1. The process of removing both cations and anions from aqueous media which comprises applying a D.C. electrical potential to said media by means of a solid electrically conductive anode structure containing as an essential ingredient a water-insoluble redox polymer, whose repeating units in their oxidized cationic form have the formula:

(A) 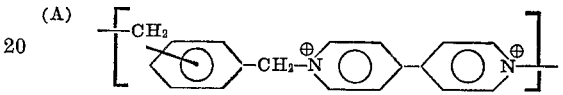

and a solid electrically conductive cathode structure comprising a water-insoluble polyelectrolyte complex of (1) a water-soluble redox polymer having repeating units of Formula A and (2) the polyanions of a water-soluble cation exchange resin.

2. The process of claim 1 wherein, after the anode and cathode have been used to remove anions and cations from an aqueous medium, the capacity of the anode and cathode to remove anions and cations respectively, is regenerated by reversing the polarity of the electrode assembly in contact with an expendable aqueous medium.

3. The process of claim 1 wherein the cation exchange resin is a polysulfonic acid.

4. The process of claim 3 wherein the polysulfonic is a polystyrene sulfonic acid.

5. The process of claim 3 wherein the polysulfonic acid is a polyethylene sulfonic acid.

6. The process of claim 1 wherein the cation exchange resin is a polyacrylic acid.

7. The process of claim 2 wherein the cation exchange resin is a polysulfonic acid.

8. The process of claim 7 wherein the polysulfonic acid is a polystyrene sulfonic acid.

9. The process of claim 7 wherein the polysulfonic acid is a polyethylene sulfonic acid.

10. The process of claim 2 wherein the cation exchange resin is a polyacrylic acid.

References Cited

UNITED STATES PATENTS

| | | | |
|---|---|---|---|
| 3,180,815 | 4/1965 | Kollsman | 204—80 R X |
| 3,244,612 | 4/1966 | Murphy | 204—291 X |
| 3,515,664 | 6/1970 | Johnson et al. | 204—149 X |

FOREIGN PATENTS

| | | | |
|---|---|---|---|
| 564,923 | 7/1957 | Italy | 204—149 |

GERALD L. KAPLAN, Primary Examiner

A. C. PRESCOTT, Assistant Examiner

U.S. Cl. X.R.

204—180 R, 180 B

UNITED STATES PATENT OFFICE
CERTIFICATE OF CORRECTION

Patent No. 3,687,829       Dated  August 29, 1972

Inventor(s)  Arnold Factor

It is certified that error appears in the above-identified patent and that said Letters Patent are hereby corrected as shown below:

Column 7, last portion of equation should read

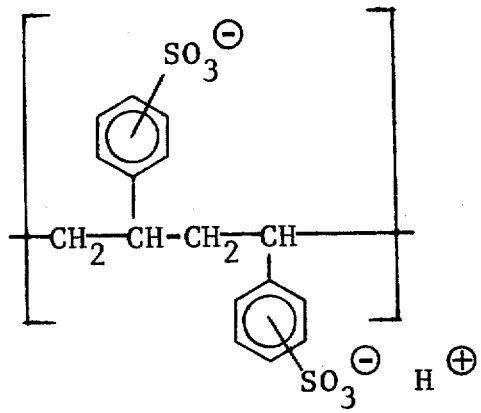

In Table I, bridging columns 9 and 10, in the heading change "Composition" to - Electrolyte -; In Table II, bridging columns 9 and 10, in the heading change "$C_{22}$" to - $C_2$ -, and in the fourth column, fourth entry from the bottom, change 2.2(1) to - 22.2(1) -; In Table IV, last entry in line for cycle 1 should read - 0.85. -; In Table V, first column, change "41" to - 51 -; and in note change "$C^{S\ell}/C$" to - $C^{Na}/C$ - and "$C^S/C$" to - $C^{Ca}/C$ -; In Table VII, in heading of tenth column, after "calculated," delete - 3 -, in second column of second entry change "Bemoved" to
- Removed -, and in footnote 4, change "caic." to
- calc. -.

Signed and sealed this 1st day of May 1973.

(SEAL)
Attest:

EDWARD M.FLETCHER,JR.         ROBERT GOTTSCHALK
Attesting Officer             Commissioner of Patents